United States Patent
Premi et al.

[11] Patent Number: 6,084,568
[45] Date of Patent: Jul. 4, 2000

[54] SYSTEM AND METHODS FOR BOTH 2-TAP AND 3-TAP FLICKER FILTERING OF NON-INTERLACED COMPUTER GRAPHICS TO INTERLACED LINES FOR TELEVISION DISPLAY

[75] Inventors: Reena Premi, Santa Clara; William S. Herz, Newark; Ignatius B. Tjandrasuwita, Union City, all of Calif.

[73] Assignee: S3 Incorporated, Santa Clara, Calif.

[21] Appl. No.: 08/969,637

[22] Filed: Nov. 13, 1997

(Under 37 CFR 1.47)

[51] Int. Cl.$^7$ .............. G09G 5/04; G09G 5/36; H04N 7/01
[52] U.S. Cl. .............. 345/154; 345/133; 345/327; 348/446; 348/447
[58] Field of Search .............. 345/154, 327, 345/509; 348/441, 446, 447, 448, 910

[56] References Cited

U.S. PATENT DOCUMENTS

| | | | |
|---|---|---|---|
| 5,387,940 | 2/1995 | Kwok et al. | 348/446 |
| 5,455,628 | 10/1995 | Bishop | 348/446 |
| 5,610,661 | 3/1997 | Bhatt | 348/448 |
| 5,781,241 | 7/1998 | Donovan | 348/441 |

Primary Examiner—Bipin H. Shalwala
Assistant Examiner—David L Lewis
Attorney, Agent, or Firm—Fenwick & West LLP

[57] ABSTRACT

A device performs both 2-tap and 3-tap flicker filtering of non-interlaced lines of computer graphics data to form interlaced lines. The device includes a data packer, a data unpacker, and a filter circuit. The filter circuit combines lines that it receives to form filtered lines. The data packer writes the filtered lines to line buffers while the data unpacker reads the lines stored in the line buffers. The read lines are either sent to the filter circuit for further filtering or are outputted to be displayed as interlaced lines. Both 2-tap and 3-tap flicker filtering can be accomplished by varying the order and/or number of read, write, and filter operations.

18 Claims, 13 Drawing Sheets

6,084,568

SYSTEM AND METHODS FOR BOTH 2-TAP AND 3-TAP FLICKER FILTERING OF NON-INTERLACED COMPUTER GRAPHICS TO INTERLACED LINES FOR TELEVISION DISPLAY

BACKGROUND OF THE INVENTION

1. Field of the Invention

This invention relates generally to processing of computer graphics for display on a television, and more particularly, to flicker filtering for computer graphics.

2. Description of the Related Art

As the result of the continuous development of new technologies, the distinction between computers, in particular computer monitors, and televisions is becoming increasingly blurred. In other words, the computer and television industries are converging. For example, computer networks such as the Internet and the World Wide Web used to be almost exclusively a computer phenomena. Now, however, televisions may also be used to access these networks. As another example, broadcast entertainment used to belong squarely in the television domain. Now, however, many service providers are offering entertainment to computer users through computer networks. As a result of this convergence, there is a need to display computer graphics originally intended for computers on televisions.

Televisions and computers, however, generally use incompatible graphics formats. For example, many formats for computer monitors and flat panel displays are non-interlaced. In other words, the entire frame of computer graphics is updated at once. In contrast, many common television formats are interlaced, meaning that the frame is divided into odd and even fields and only one field or half the frame is updated at a time.

As a result, in order to display computer graphics on a television, the computer graphics often must be converted from a (non-interlaced to an interlaced format). This conversion typically includes dropping lines of the display. However, this introduces undesirable visual effects as a result of the conversion from a non-interlaced to an interlaced format.

In addition to the conversion process, the prior art also performs flicker filtering to improve the image quality. Two common types of flicker filtering are 2-tap and 3-tap filtering, in which either two or three non-interlaced lines are combined to form each interlaced line. The prior art has attempted to accomplish flicker filtering by dropping lines in both even and odd fields to vertically make the non-interlaced image match the scans line common for interlaced displays.

However, there are two problems with the prior art approach. First, the prior art requires that flicker filtering and the conversion be performed serially, one after the other. Moreover, each process, flicker filtering and the conversion, requires its own hardware or a general purpose graphics processor with software to perform each process. Furthermore, the prior art does not provide a way to perform both 2-tap and 3-tap flicker filtering.

Thus, there is a need for approaches with the capability of implementing both 2-tap and 3-tap filtering. In addition, there is a need to perform these operations while minimizing hardware requirements.

SUMMARY OF THE INVENTION

In accordance with the present invention, a device which can perform both 2-tap and 3-tap flicker filtering of non-interlaced lines of computer graphics data to form interlaced lines includes a data packer, a data unpacker, and a filter circuit.

The filter circuit receives non-interlaced lines from a computer graphics source and also receives lines temporarily stored in two line buffers. The filter circuit filters the received lines to form filtered lines. The data packer converts the filtered lines to a format suitable for the line buffers and then writes them to the line buffers. The data unpacker reads the lines stored in the line buffers and converts them to a format suitable for the filter circuit. The read lines are either sent to the filter circuit for further filtering or are outputted to be displayed. Both 2-tap and 3-tap flicker filtering can be accomplished by varying the order and/or number of read, write, and filtering operations.

The present invention is particularly advantageous because both 2-tap and 3-tap flicker filtering may be accomplished by the same hardware. Moreover, the hardware is simplified since the same basic functions of reading, writing, and filtering are used to accomplish both 2-tap and 3-tap flicker filtering.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
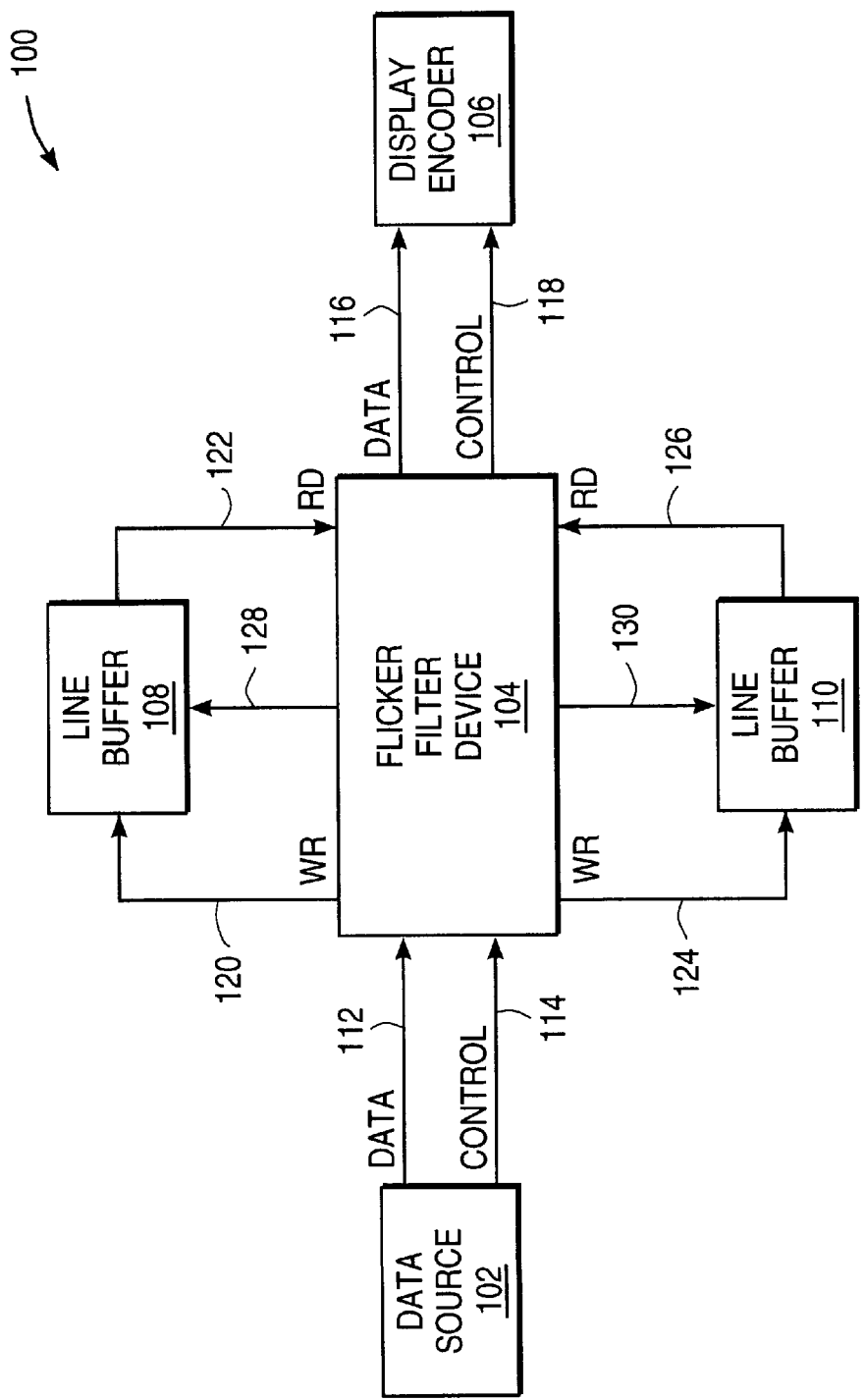
FIG. 1 is a block diagram of a system including the present invention.

FIG. 1 is a block diagram of a system 100 including the present invention. The system 100 includes a data source 102, a flicker filter device 104, a display encoder 106, and two line buffers 108 and 110. The data source 102 is coupled to send input data and an input control signal to the flicker filter device 104 on lines 112 and 114, respectively. Those skilled in the art will realize that the flicker filter device 104 could also receive and process many input data and respective control signals. The flicker filter device 104 is coupled to send output data and an output control signal to the display encoder 106 on lines 116 and 118, respectively. The flicker filter device 104 is also coupled to write and read data to and from the line buffers 108 and 110 on lines 120, 122, 124, and 126, respectively. The read/write operations are controlled by control signals sent from the flicker filter device 104 to the line buffers 108 and 110 on lines 128 and 130, respectively.

The data source 102 provides computer graphics in non-interlaced form and corresponding control signals to the flicker filter device 104. In one embodiment, the data source 102 is a Streams processor or other similar graphics engine, specifically a CRT controller. In an exemplary embodiment, the data source 102 is a Trio 64V+ or ViRGE graphics controller chip made by S3 Incorporated of Santa Clara, Calif. In a preferred embodiment, the data source 102 is a MUX that may select from a number of different data sources, including Streams Processors. In a preferred embodiment, the input data from the data source 102 on line 112 is digital data in RGB format.

The flicker filter device 104 receives the non-interlaced input data on line 112 and flicker filters the data to produce an interlaced output data on line 116. The device 104 also generates the corresponding output control signal on line 118. In a preferred embodiment, the flicker filter device 104 includes four modes of operation. First, in the 2-tap filter mode, the flicker filter device 104 combines two lines of non-interlaced input data to produce each line of interlaced output data. Second, in the 3-tap filter mode, the flicker filter device 104 combines three lines of non-interlaced input data to produce each line of interlaced output data. Third, in the no filter mode, the flicker filter device 104 receives non-interlaced data on line 112 passes it through to the display encoder 106 via line 116 without any flicker filtering. Fourth, in a convert only mode, the flicker filter device 104 receives non-interlaced data and converts it from non-interlaced to interlaced, and then it is passed through to the display encoder 106 via line 116 without any flicker filtering.

The display encoder 106 receives the interlaced output data on line 116 and provides a source of interlaced data for a display device (not shown in FIG. 1). In some embodiments, the display encoder 106 may convert the format of the incoming data to a format more suitable for the display device. For example, in a preferred embodiment, the display device is a television, and the display encoder 106 is a TV encoder. The TV encoder 106 may convert the received data on line 116 from a digital to an analog format and/or from a discrete time to a continuous time signal and/or between various color formats.

The line buffers 108 and 110 are utilized during flicker filtering. In a preferred embodiment, only one of the line buffers 108 or 110 is used for 2-tap filtering; while both buffers 108 and 110 are used for 3-tap filtering.

In a preferred embodiment, the line buffers 108 and 110 are multi-purpose static RAM which can also be used for other purposes. For example, if the flicker filter device 104 is in 2-tap mode and buffer 108 is used for the 2-tap filtering, then buffer 110 may be used for other, perhaps completely unrelated, purposes. As a specific example, in a preferred embodiment, the data source 102 is a streams processor and line buffer 110 is shared with the streams processor. In 2-tap mode, the streams processor may then use the line buffer 110 to vertically interpolate a secondary stream. In no filter mode, both line buffers 108 and 110 may be used for other purposes, such as supporting a second video stream for video conferencing.

Figure 2:
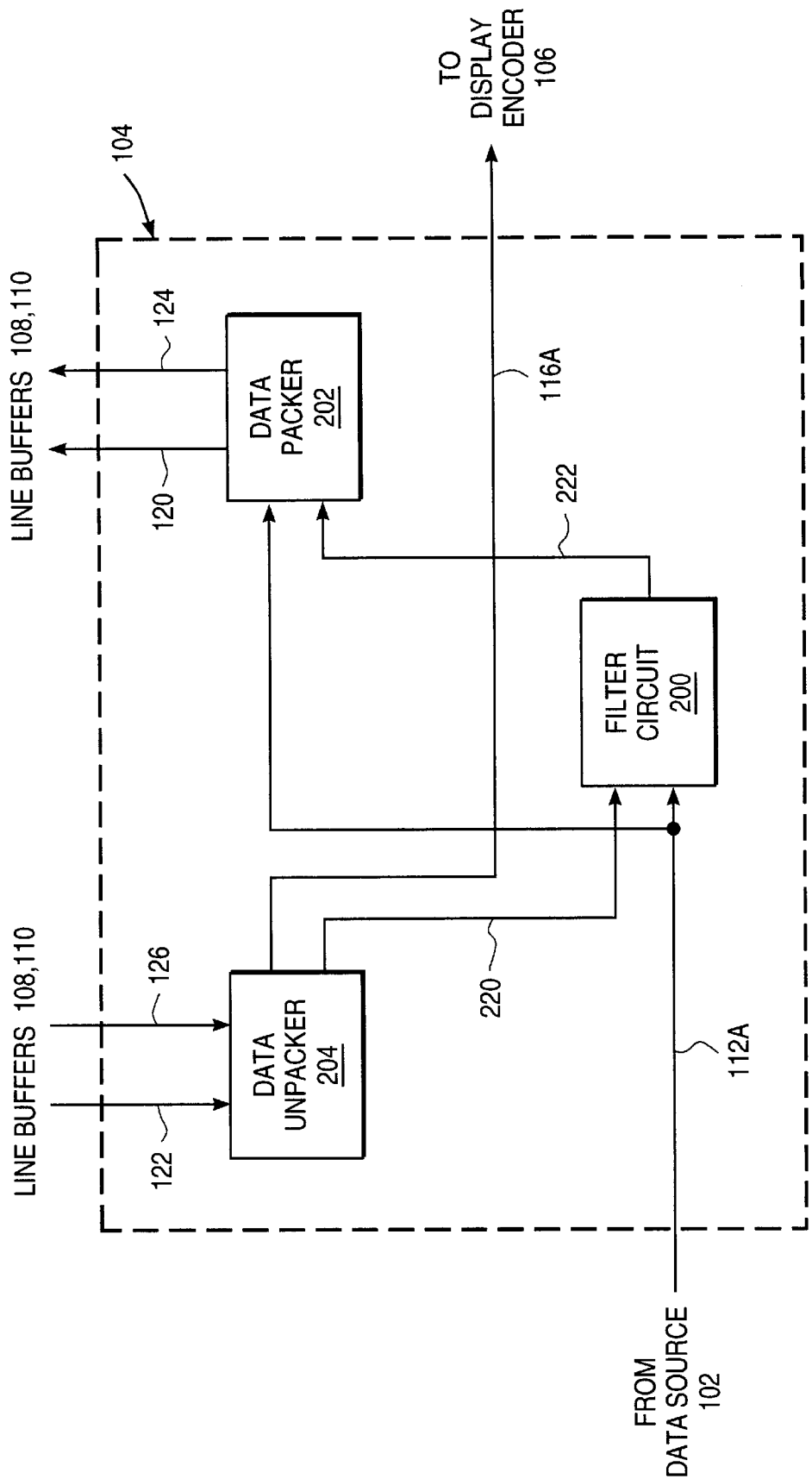
FIG. 2 is a block diagram of a preferred embodiment of the flicker filter device 104 of FIG. 1, used to illustrate data flow through the device.

FIG. 2 is a block diagram of a preferred embodiment of the flicker filter device 104 of FIG. 1, used to illustrate data flow through the device. The flicker filter device 104 includes a filter circuit 200, a data packer 202, and a data unpacker 204. All of the lines shown in FIG. 2 are data lines.

The filter circuit 200 has two inputs and one output. A first input is adapted to receive input data in an external format on line 112A; the second input is coupled to receive data from the data unpacker 204 on line 220. The output is coupled to send data to the data packer 202 on line 222. The filter circuit 200 combines the two input data streams, each of which typically represents a line of computer graphics, into a single filtered data line which is output to the data packer 202. In a preferred embodiment, the filter circuit 200 forms a weighted sum of the two input lines. In other words, each of the input lines is multiplied by a constant and the two products then summed to form the filtered line. In other embodiments, the filter circuit 200 may combine more than two data streams into a single filtered data line and/or may receive more than one data stream on either line 112A or 220. For example, the filter circuit 200 may use a standard filter such as where the first line is multiplied by f and the second line is multiplied by (1−f), where $0 \leq f \leq 1$. Still more particularly, such an exemplary filter is given by a using a pixel from row 1 (Row 1) and a pixel from row 2 (Row 2) in the equation:

$$\frac{(\text{Row } 1 * f)}{16} + \frac{(\text{Row } 2 * (1 - f))}{16}$$

In this example, the pixels are each 8 bits while f is 4 bits. Each numerator is therefore 12 bits. Dividing by 16 reduces the result to 8 bits.

The data packer 202 is adapted to write data lines to the line buffers 108 and 110 via lines 120 and 124. The data packer 202 receives the filtered line from the filter circuit 200, converts the filtered line from its external format to an internal format, and then writes the line to one of the line buffers 108 or 110.

The terms "internal" and "external" are with respect to the line buffers 108 and 110. The "internal format" is the format used in storing data to the line buffers 108 and 110; while the "external format" is the one used in processing data in the filter circuit 200.

In a preferred embodiment, the "external format" is the 4:4:4 signed YCrCb format; while the "internal format" may be either the 4:2:2 or the 4:1:1 YCrCb format. The YCrCb format is advantageous because many filters rely heavily on the luminance value, which is the Y in YCrCb. The 4:2:2 and 4:1:1 formats are shorter than the 4:4:4 format, thus allowing the use of smaller line buffers 108 and 110 or, alternatively, allowing more complex filtering to be accomplished with the same size line buffers. For example, data that requires 24 bits per pixel (bpp) in 4:4:4 format would require 16 bpp in 4:2:2 format and 12 bpp in 4:1:1 format. The conversion of the data by the data packer 202 from 4:4:4 YCrCb format to 4:2:2 or 4:1:1 YCrCb format may be done using any one of several circuits and methods well know in the art.

The data unpacker 204 is adapted to read data lines from the line buffers 108, 110 via lines 122, 126, respectively. The data unpacker 204 receives the data line from the line buffer 108 or 110, converts the line from internal to external format, and then either sends the line to the filter circuit 200 for further filtering or outputs the data line on line 116A. The data unpacker 204 converts the data from 4:2:2 or 4:1:1 YCrCb format to 4:4:4 YCrCb format using any one of the conventional circuits or methods well known in the art.

General operation of the flicker filter device 104 occurs as follows. The line buffers 108 and/or 110 hold intermediate results. The data unpacker 204 reads these intermediate results from the line buffers 108 and 110. If the intermediate result is a completed interlaced line, then it is output on line 116A. If it is not a completed interlaced line, then the filter circuit 200 combines the intermediate results with an incoming non-interlaced line received on line 112A. The new intermediate result is then written to the line buffers 108 and 110 by data packer 202, and the process is repeated.

In an alternate embodiment, the data packer 202 is also adapted to receive input data in an external format on line 112A, thus allowing the writing of such data directly to the line buffers 108 and 110 without first requiring a pass through the filter circuit 200.

Figure 3A:
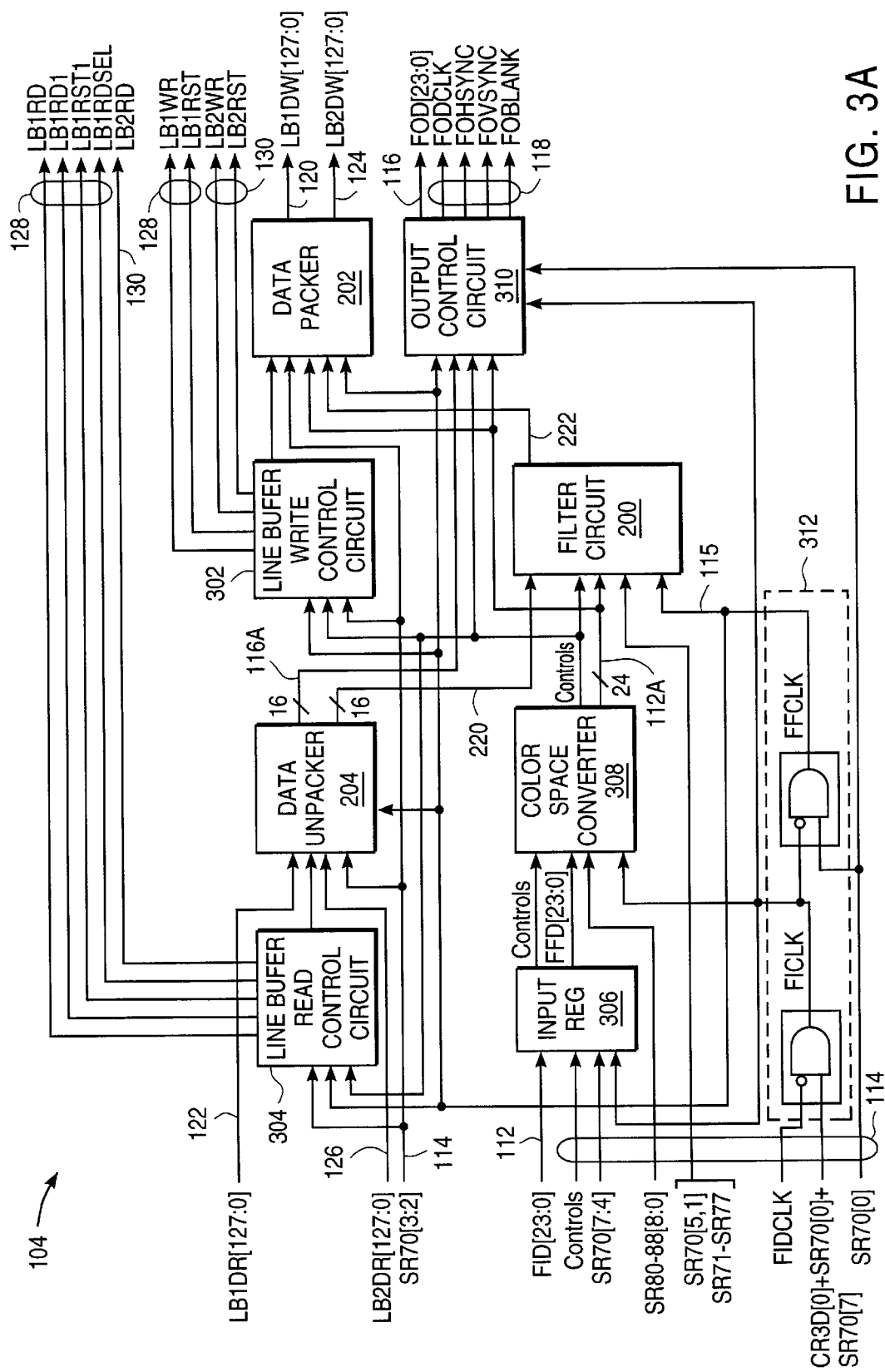
FIG. 3A is a block diagram of a preferred embodiment of the flicker filter device 104 of FIGS. 1 and 2.

FIG. 3A is a detailed block diagram of a preferred embodiment of the flicker filter device 104 of FIGS. 1 and 2. In addition to the components shown in FIG. 2, the flicker filter device 104 further includes a line buffer write control circuit 302, a line buffer read control circuit 304, an input register 306, a color space converter 308, an output control circuit 310, and a clock circuit 312. Before describing how the various components are coupled, it will be useful to describe the various signals received and sent by the flicker filter device 104.

The input data on line 112 includes 24 bits of RGB data, denoted by FID[23:0].

The input control signal on line 114 includes control signals for controlling operation of the flicker filter device 104 and control signals for controlling display of the input data. The former include the signals shown in Table 1 below; while the latter are denoted by "Controls" in FIG. 3A and are summarized in Table 2.

TABLE 1

Input Control Signals for Controlling the Flicker Filter Device 104

| Input Control Signal | Function |
| --- | --- |
| SR70[3:2] | Determines the internal format. |
| SR80–88[8:0]; SR72[6] | Controls and coefficients for the color space converter 308. |
| SR70[5,1]; SR71–SR77 | Controls the filter circuit 200. |
| SR70[4] | Controls the output control circuit 310. |
| CR3D[0] | Enables the flicker filter device 104. |
| SR70[0] | Enables flicker filtering. |

TABLE 2

Input Control Signals for Controlling Display of Input Data

| Input Control Signal | Function |
| --- | --- |
| FIDCLK | Dot Clock |
| FIHSYNC | Horizontal Sync |
| FIVSYNC | Vertical Sync |
| FIHDE | Horizontal Display Enable |
| FIVDE | Vertical Display Enable |
| FIODDF | Indicates whether odd field or even field is to be produced. |
| FISSDE | Indicates the location of secondary stream data |

TABLE 2-continued

Input Control Signals for Controlling Display of Input Data

| Input Control Signal | Function |
| --- | --- |
| FIHBLANK | Horizontal Blanking |
| FIVBLANK | Vertical Blanking |

The output data on line 116 includes 24 bits of 4:4:4 YCrCb data, denoted by FOD[23:0].

The output control signal on line 118 includes the signals shown in Table 3 below.

TABLE 3

Output Control Signals

| Output Control Signal | Function |
| --- | --- |
| FODCLK | Dot Clock |
| FOHSYNC | Horizontal Sync |
| FOVSYNC | Vertical Sync |

The line buffers 108 and 110 can store 720 16-bit pixels or 900 12-bit pixels in the preferred embodiment of FIG. 3A. Data is written to or read from the line buffers 108 and 110 in 128 bit chunks, as denoted by signals LB1DW[127:0], LB1DR[127:0], LB2DW[127:0], and LB2DR[127:0].

Line buffer 108 includes two read pointers and one write pointer. The control signal for line buffer 108 on line 128 includes the signals shown in Table 4 below.

TABLE 4

Control Signals for Line Buffer 108

| Control Signal | Function |
| --- | --- |
| LB1RD | Read pulse for first read pointer |
| LB1RD1 | Read pulse for second read pointer |
| LB1WR | Write pulse |
| LB1RDSEL | Selects between first and second read pointers |
| LB1RST | Reset first read pointer and write pointer. |
| LB1RST1 | Reset second read pointer. |

Line buffer 110 includes one read pointer and one write pointer. The control signal for line buffer 110 on line 130 includes LB2RD, a read pulse; LB2WR, a write pulse; and LB2RST, a reset for the read and write pointers.

The couplings and basic functions of each of the components in the flicker filter device 104 will now be described.

The clock circuit 312 is adapted to receive the input clock FIDCLK and various other input control signals on line 114 and outputs two clocks: FICLK and FFCLK. More specifically, FIDCLK is inverted and then gated with CR3D[0] (circuit enable), and SR70[0] (flicker filter enable), to generate FICLK, which latches input data and input control signals into the input register 306 and also clocks the color space converter 308. In turn, FICLK is inverted and gated with SR70[0] to generate FFCLK, which clocks the rest of the flicker filter device 104. The skew from FIDCLK to FICLK and the skew from FICLK to FFCLK each is preferably less than half of the minimum clock period.

The input register 306 is adapted to receive the input data on line 112 and Controls on line 114, and is also coupled to receive clock FICLK from the clock circuit 312. The register 306 latches the input data and input control signals on the rising edge of FICLK and then outputs the latched Controls and RGB data, now denoted as FFD[23:0].

The color space converter 308 is coupled to receive Controls and RGB data FFD[23:0] from input register 306 and is also coupled to receive FICLK from the clock circuit 312 for clocking purposes. The color space converter 308 is also adapted to receive various other input control signals on line 114. The color space converter 308 performs initial color processing on the input data, partially in response to the control signals received on line 114. More specifically, the color space converter 308 converts the input data from RGB format to 4:4:4 signed YCrCb format, the external format. The color space converter 308 may also perform other initial processing, such as color adjustments or chroma filtering. In a preferred embodiment, the color space converter 308 includes a 9-tap chroma filter (not shown) that performs chroma filtering on the output from the color spaced converter. Preferably, the chroma filter uses coefficients of {3, 6, 8, 10,.10, 10, 8, 6, 3}, and scales by 1/64. The processed data, now in YCrCb format, is output on line 112A. The corresponding Controls are also output by the color space converter 308.

The filter circuit 200 is coupled to receive Controls and the YCrCb data from the color space converter 308. The filter circuit 200 is also coupled to receive data from the data unpacker 204 on line 220. The filter circuit 200 is further coupled to receive FFCLK from the clock circuit 312 on line 115 and adapted to receive various input control signals SR70[5,1] and SR71–SR77 on line 114. As described previously, the filter circuit 200 combines the received input data streams into a single filtered data line which is output to the data packer 202 on line 222. Although FIG. 3A only depicts two lines 112A and 220 for receiving data to be filtered, this depiction is for purposes of clarity in FIG. 3A. The filter circuit 200 is not limited to combining two data streams at a time. The filtering is controlled by the various received control signals and clocked by FFCLK.

The data packer 202 is coupled to receive the filtered data from the filter circuit 200 on line 222. The data packer 202 is also coupled to receive data in the external format, 4:4:4 YCrCb format in this embodiment, directly from the color space converter 308 on line 112A. The data packer 202 is further coupled to receive control signals from the write control circuit 302, adapted to receive input control signals on line 114, and coupled to receive FFCLK from the clock circuit 312. As described previously, the data packer 202 converts received data lines from the external format to an internal format, and then writes the re-formatted line to one of the line buffers 108 or 110 via lines 120 or 124.

The line buffer write control circuit 302 controls the writing of data from the data packer 202 to the line buffers 108 or 110. More specifically, the write control circuit 302 is coupled to receive Controls from the color space converter 308 and FFCLK from the clock circuit 312, and is adapted to receive input control signals on line 114. In response to these inputs, the write control circuit 302 generates control signals for the data packer 202 and write control signals for line buffers 108 and 110 on lines 128 and 130, respectively.

The data unpacker 204 is adapted to receive data lines from the line buffers 108 and 110 via lines 122 and 126. The data unpacker 204 is further coupled to receive control signals from the read control circuit 304 and adapted to receive input control signals on line 114. As described previously, the data unpacker 204 converts received lines from internal to external format, and then either sends the line to the filter circuit 200 on line 220 for further filtering or outputs the data line on line 116A.

The line buffer read control circuit 306 controls the reading of data from the line buffers 108 or 110 to the data unpacker 204. More specifically, the read control circuit 304 is coupled to receive Controls from the color space converter 308 and FFCLK from the clock circuit 312, and is adapted to receive input control signals on line 114. In response to these inputs, the read control circuit 304 generates control signals for the data unpacker 204 and read control signals for line buffers 108 and 110 on lines 128 and 130, respectively.

Finally, the output control circuit 310 is coupled to receive data from the data unpacker 204 on line 116A or from the color space converter 308 on line 112A. The output control circuit 310 also is coupled to receive control signals from the color space converter 308, coupled to receive FICLK and FFCLK from the clock circuit 312, and adapted to receive input control signals on line 114. The output control circuit 310 sends output data, denoted FOD[23:0], to the display encoder 106 of FIG. 1 on line 116. The output control circuit 310 also converts the input Controls to output control signals appropriate for the output data. The output control signals are transmitted to the display encoder 106 on line 118.

The above components were described in the context of converting non-interlaced input data to interlaced output data. The flicker filter device 104, however, need not always implement flicker filtering. For example, the flicker filter device 104 may only perform conversion of the data from non-interlaced to interlaced without flicker filtering by setting the value of f to one. For example, flicker filtering may be disabled by not asserting SR70[0] independent of whether conversion is done. Then, the output data provided by the output control circuit 310 will be the unfiltered data received from the color space converter 308 on line 112A, and the output clock FODCLK will be FICLK. In contrast, if flicker filtering is enabled, then the output data will be data from the data unpacker 204 on line 116A and the output clock FODCLK will be FFCLK.

Figure 3B:
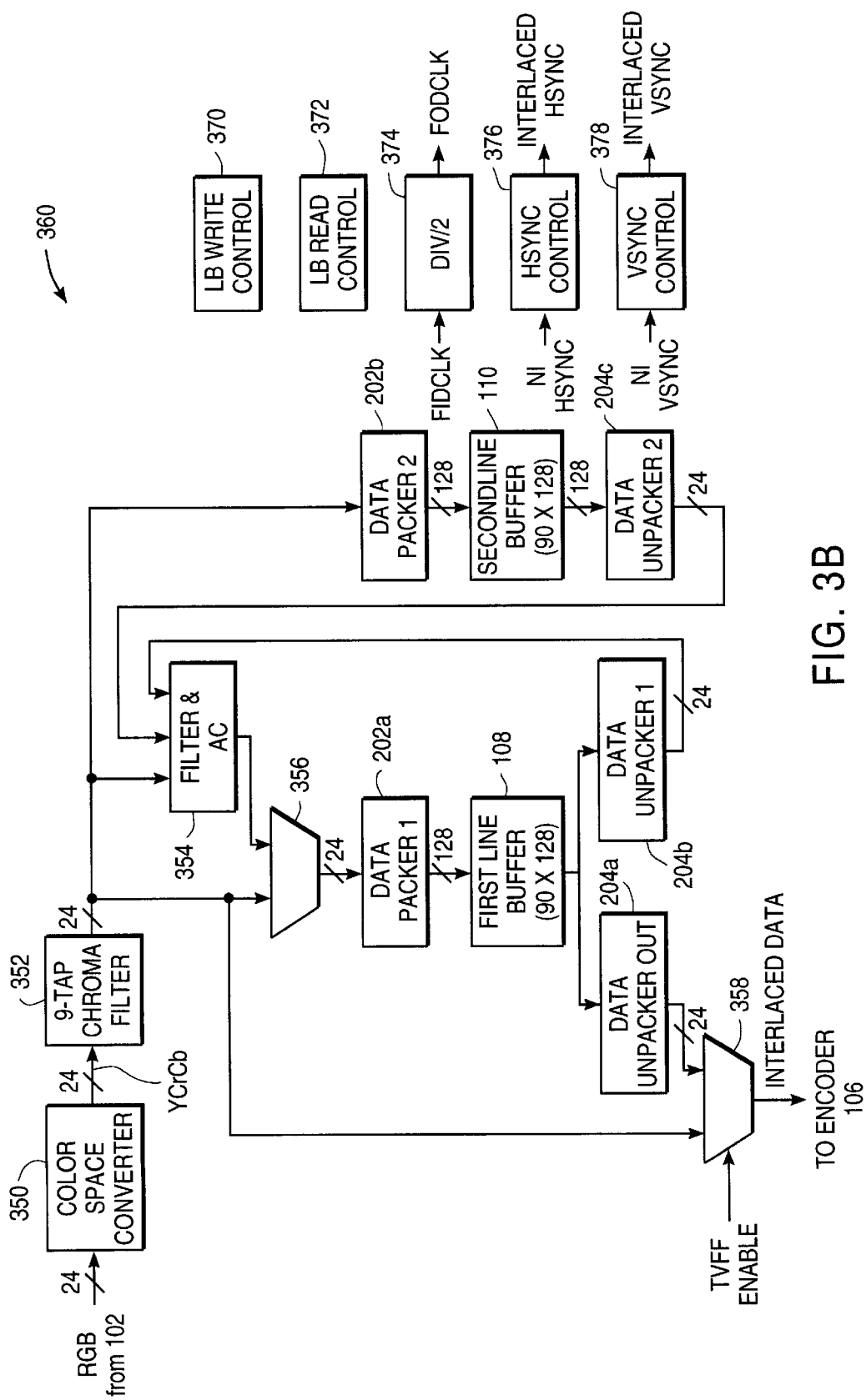
FIG. 3B is a block diagram of a second alternate embodiment of the flicker filter device 104.

Referring now to FIG. 3B, a second embodiment 360 of the flicker filter device 104 is shown. The second embodiment 360 preferably comprises a color space converter 350, a 9-tap chroma filter 352, a plurality of multiplexers 356, 358, a filter and aperture correction circuitry 354, and other control circuitry 370, 372, 374, 376, 378. The second embodiment 360 of the flicker filter device 104 is shown coupled to a plurality of data packers 202a, 202b, a plurality of data unpackers 204a, 204b, 204c, the first line buffer 108 and the second line buffer 110.

The color space converter 350 is coupled to the data source 102 to receive an RGB signal. The color space converter 350 preferably converts 24 bits of RGB to 24 bits in YCrCb format. This conversion is done in a conventional manner. The output of the color space converter 350 is coupled to the input of the 9-tap chroma filter 352. The 9-tap chroma filter 352 performs chroma filtering in a manner described above using the coefficients uses coefficients of {3, 6, 8, 10, 10, 10, 8, 6, 3}, and scaling by 1/64, for example. The output of the 9-tap chroma filter 352 is provided to an input of the first multiplexer 356, to an input of the second multiplexer 358, to an input of the flicker filter & aperture correction circuitry 354, and to an input of the second data packer 202b.

The second multiplexer 358 also has a second input coupled to the output of the data unpacker out 204. The control input is coupled to receive a TVFF enable signal.

Thus, the second multiplexer 358 either outputs a flicker filtered signal from the data unpacker out 204 or an signal that is not flicker filtered directly from the output of the 9-tap chroma filter 352.

The first multiplexer 356 has its first input coupled to the output of the 9-tap chroma filter 352, as described above, and a second output coupled to the output of the flicker filter & aperture correction circuitry 354. The first multiplexer 356 provides at its output either the new in coming data line or data from the flicker filter & aperture correction circuitry 354. The output of the first multiplexer 356 is in turn coupled to the first data packer 202a which packs the data for storage in the first line buffer 108. The first data packer 202a operates similar to device 202 described above. The first data packer has an input coupled to the output of the first multiplexer 356 and an output coupled to an input of the first line buffer 108.

The first line buffer 108 is used to store data that has been partially flicker filtered, and partial sums. The output of the first line buffer 108 is coupled to an input of the data unpacker out 204a to send data to the TV encoder 106. The output of the first line buffer 108 is also coupled to an input of the data unpacker 1 204a to send data to the flicker filter & aperture correction circuitry 354.

The data packer 2 202b, the second line buffer 110, and the data unpacker 2 204c are coupled together like their counter parts the data packer 1 202a, the first line buffer 108, and the data unpacker 1 204b. However, the input to the data packer 2 202b is coupled to the output of the 9-tap chroma filter 352 as noted above, and the output of the data unpacker 2 204c is coupled to a different output of the flicker filter & aperture correction circuitry 354.

Finally, the second embodiment 360 provides similar control logic including a line buffer (LB) write control unit 370, a LB read control unit 372, a clock generator 374 which is a division circuit for generating the FODCLK signal, a horizontal sync control unit 376, and a vertical sync control unit 378. Based on the timing diagrams that will be described, those skilled in the art will understand how to construct these control units and how they operated to control the other components shown in FIG. 3B.

Figure 7A:
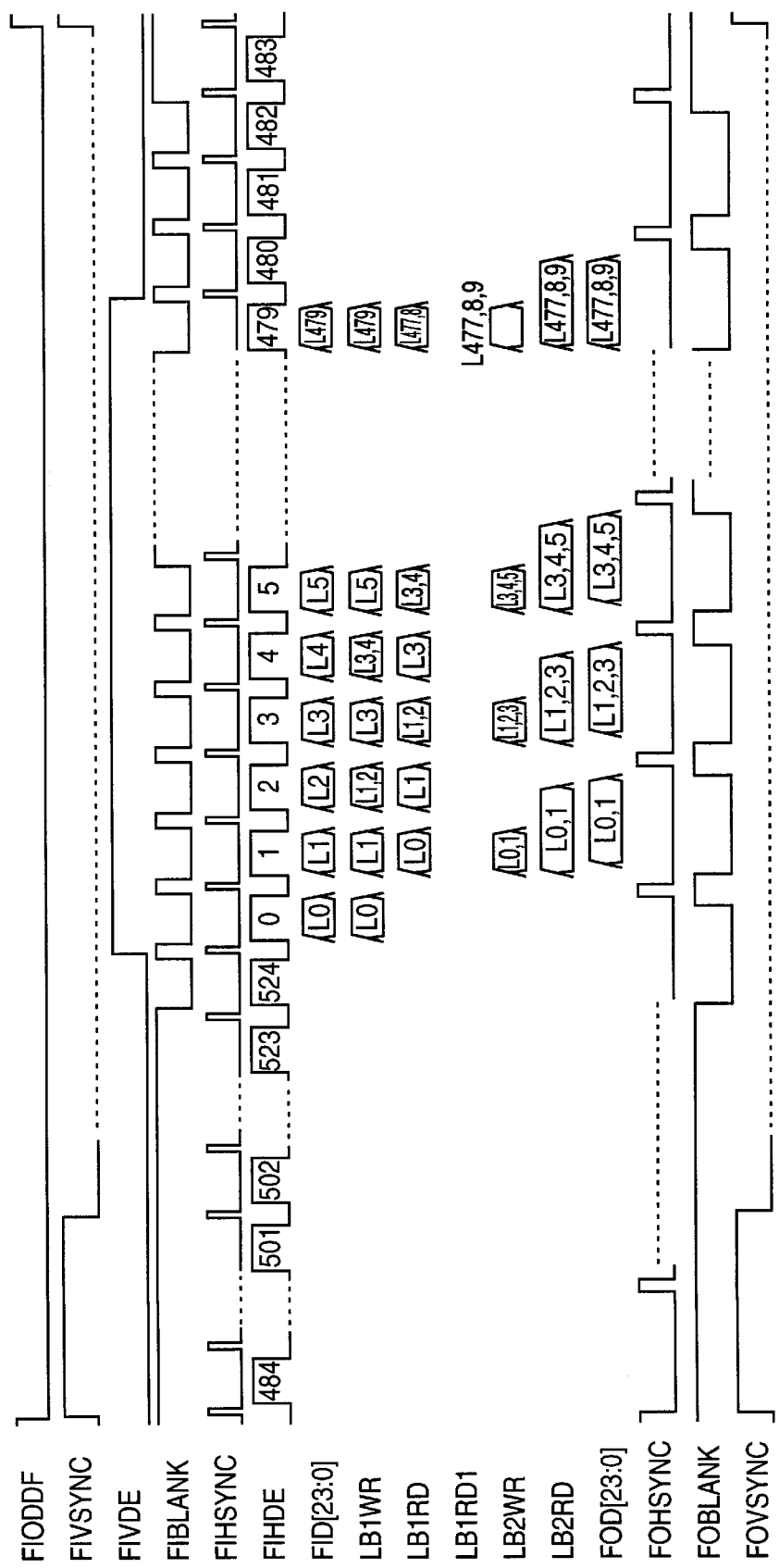
FIGS. 7A and 7B are timing diagrams illustrating a third method for 3-tap flicker filtering, utilizing the flicker filter device 104 of FIG. 3.
Figure 7B:
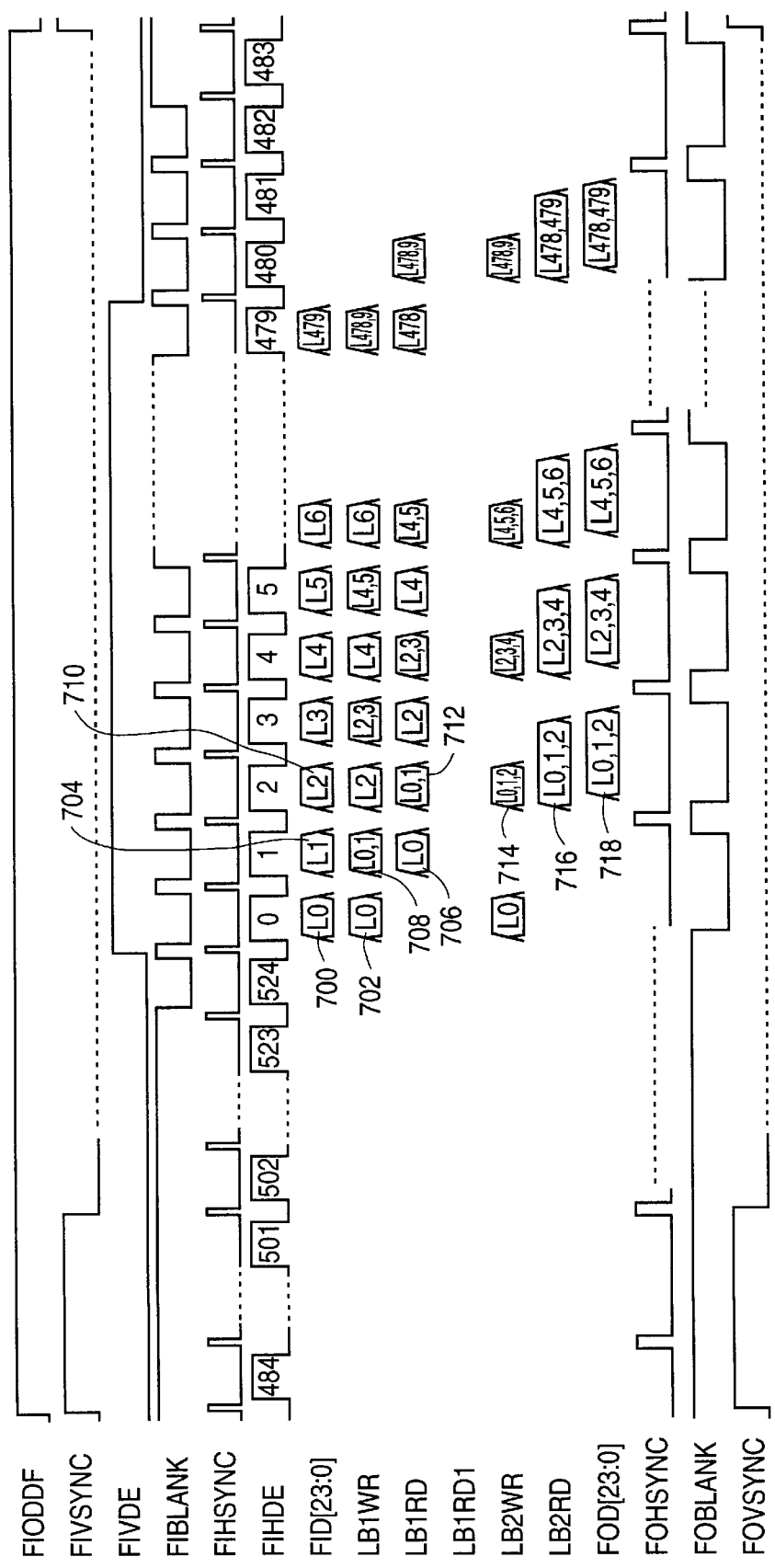
Figure 8:
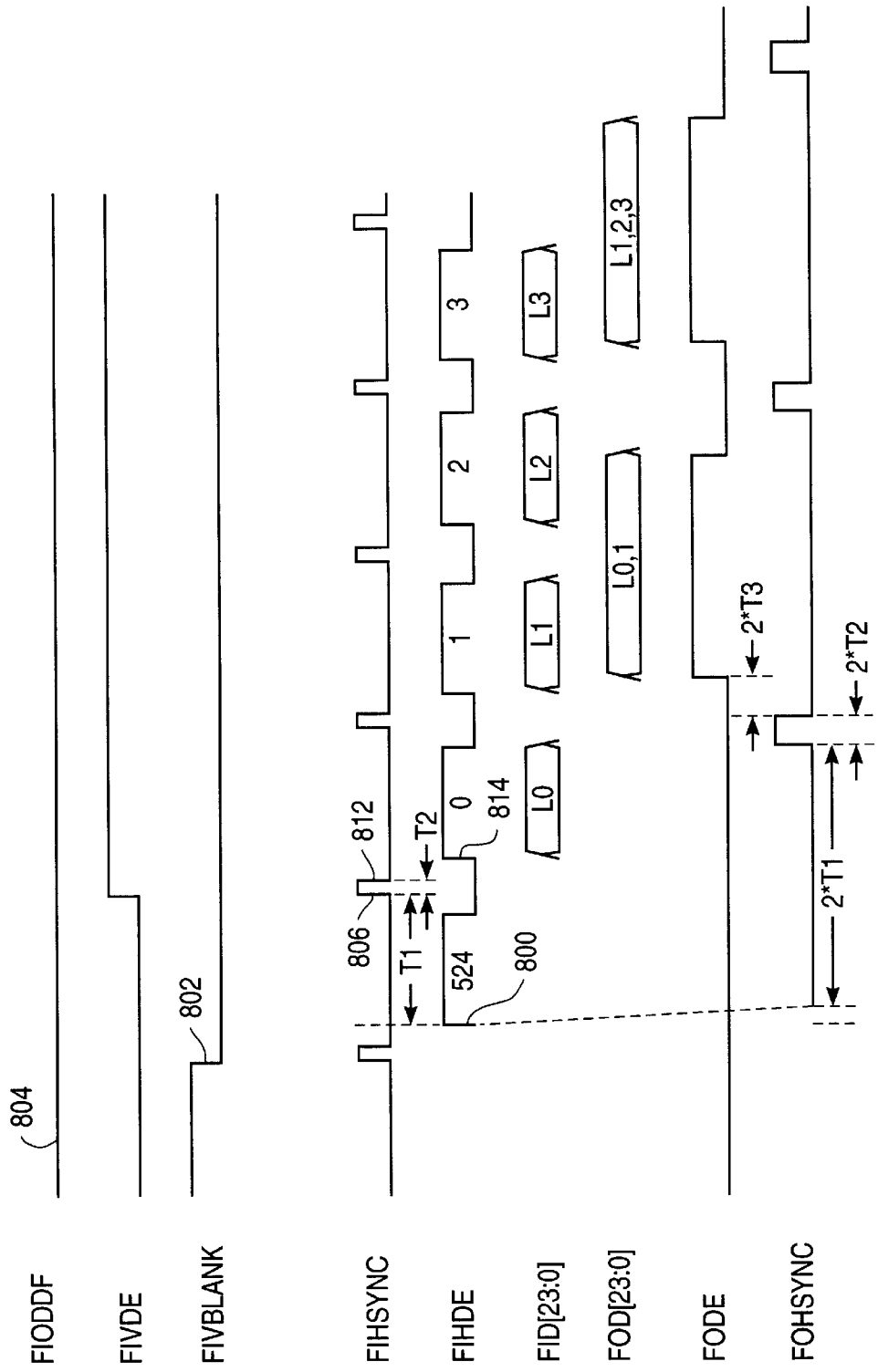
FIG. 8 is a timing diagram illustrating the production of output control signals from input control signals, utilizing the flicker filter device 360 of FIG. 3B.

FIGS. 4–8 illustrate various methods of operating the flicker filter device 104 of FIG. 3A. FIGS. 4–7 illustrate production of interlaced output data from non-interlaced input data; while FIG. 8 illustrates the production of output control signals from input control signals.

Figure 4A:
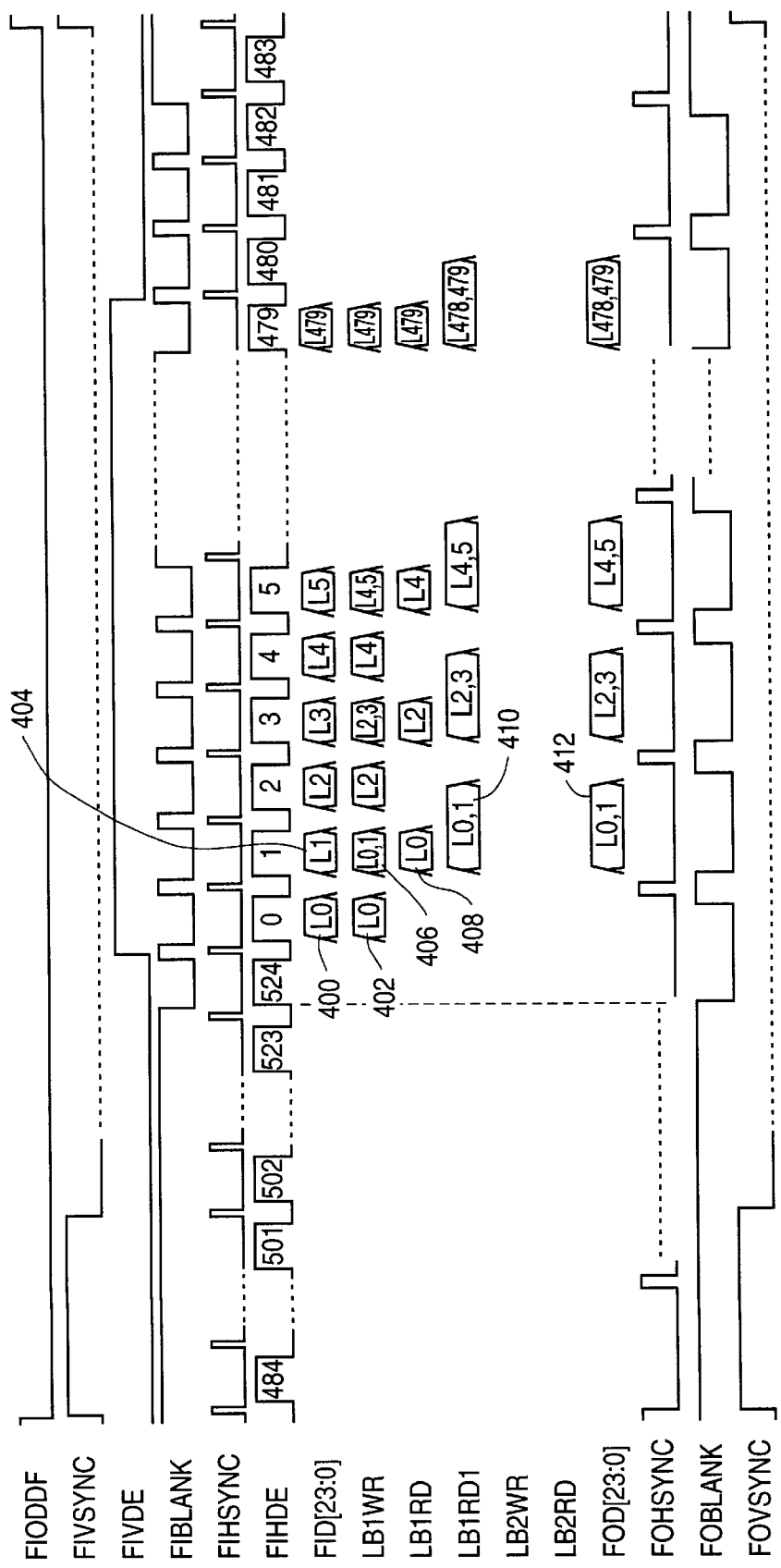
FIGS. 4A and 4B are timing diagrams illustrating a method for 2-tap flicker filtering, utilizing the flicker filter device 104 of FIG. 3.
Figure 4B:
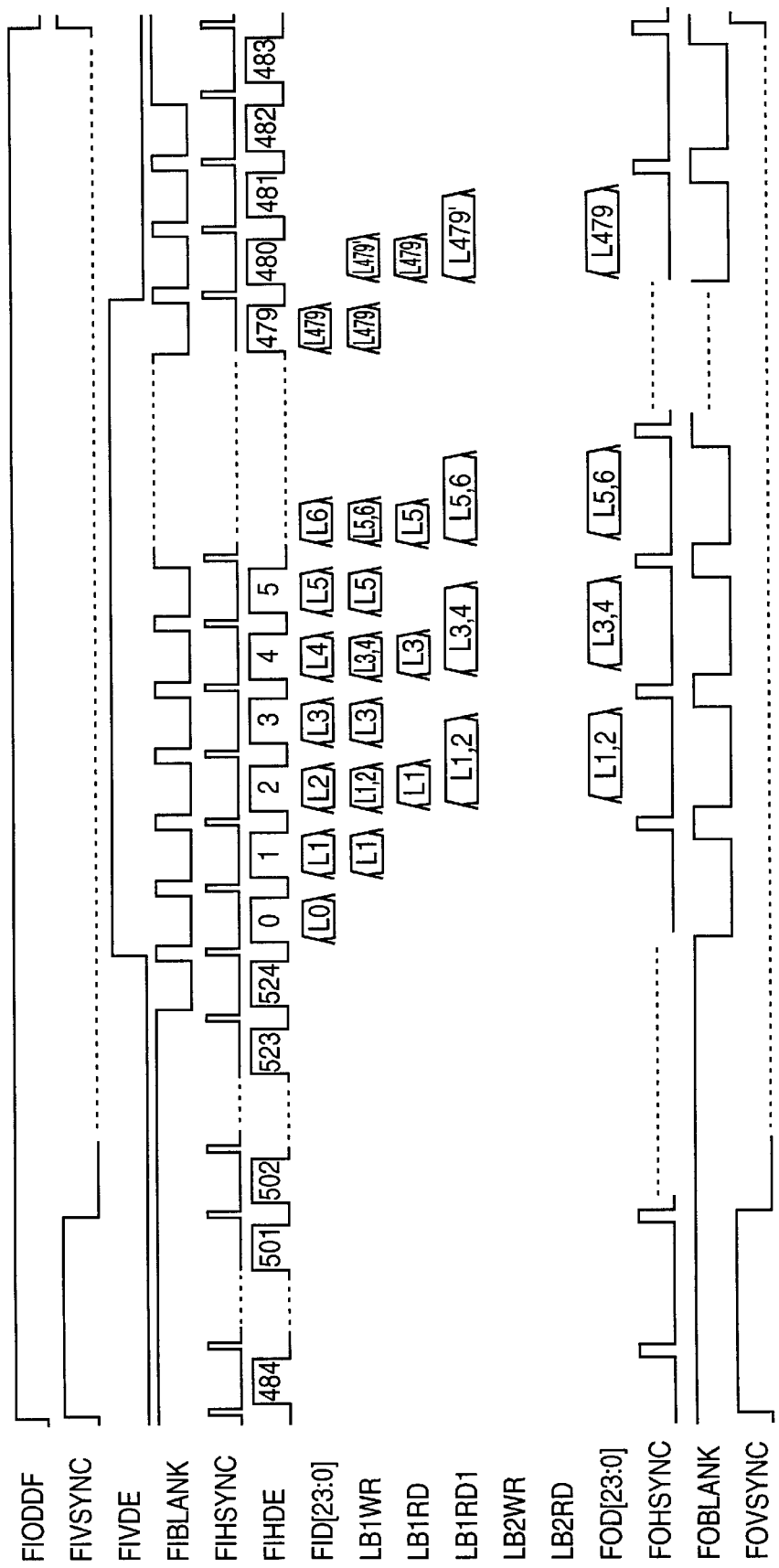

FIGS. 4A and 4B are timing diagrams illustrating a method for 2-tap flicker filtering utilizing the flicker filter device 104 of FIG. 3A. FIG. 4A illustrates the production of an even field of an interlaced output which displays a total of 480 lines; while FIG. 4B illustrates the production of the corresponding odd field. The method is not limited to displays of 480 lines. Line buffer 110 is not required for 2-tap filtering.

The nomenclature used in FIGS. 4A and 4B is as follows. The signals FIODDF, FIVSYNC, . . . FOVSYNC are as described previously with respect to FIG. 3A. The nomenclature "Ln" represents input data line n. Thus, in the 480-line example of FIGS. 4A and 4B, one frame of non-interlaced input data is represented by L0, L1, . . . L479, as illustrated in the row corresponding to FID[23:0]. The nomenclature "Lm, n" represents the data line which results from filtering input data lines m and n together. The output data lines are L0, 1; L2, 3; . . . L478, 479 for the even field of FIG. 4A and L1, 2; L3, 4; . . . L477, 478; L479' for the odd field of FIG. 4B, as illustrated in the rows corresponding to FOD[23:0].

FIG. 4A illustrates production of the even field. Line 0 (L0) is received 400 by the flicker filter device 104 and written 402 to line buffer 108. When line 1 (L1) is received 404, line 0 is read 406 from line buffer 108 and then filtered with line 1. The filtered line L0, 1 is written 408 back to line buffer 108. This is basically a read-modify-write operation for line buffer 108. When the filtered data L0, 1 is written 408 to line buffer 108, it is read 410 from line buffer 108 and outputted 412 at half the clock rate at which input data is received. The same process is repeated for successive lines to produce the even field.

In more detail, referring additionally to FIG. 3A, line 0 is received 400 by the input register 306, converted to the external 4:4:4 YCrCb format by the color space converter 308, and then converted from the external format to the internal format and written 402 to line buffer 108 by the data packer 202 under control of the write control circuit 302. Line 1 is then received 404 by the input register 306 and converted to external format by the color space converter 308. Simultaneously, line 0 is read 406 from buffer 108 and converted to external format by the data unpacker 204 under control of the read control circuit 304. Lines 0 and 1, both in external format, are then combined into filtered line L0, 1 by filter circuit 200. The filtered line L0, 1 is converted to internal format and written 408 back to line buffer 108 by the data packer 202 under control of the write control circuit 302. The data unpacker 204 under control of the read control circuit 304 reads 410 the filtered data L0, 1 from line buffer 108, converts it to external format, and outputs 412 the filtered line L0, 1 via the output control circuit 310.

One type of write 408 operation is performed to line buffer 108 but two different types of read operations are performed: one to read 406 the previously stored line and one to read 410 the output line. The two read operations 406, 410 may be implemented by using a line buffer 108 with two read ports. In the preferred embodiment of FIG. 3A, however, the two read operations 406, 410 are time multiplexed using two read pointers LB1RD and LB1RD1, with signal LB1RDSEL selecting which read pointer is active. As a result, the line buffer 108 only requires a single read port.

Furthermore, the first read pointer LB1RD and the write pointer LB1WR are both reset by LB1RST, which in this embodiment is generated in response to either FIHSYNC or the rising edge of FIHDE. The second read pointer LB1RD1 has an independent reset LB1RST1, which in this embodiment is generated once for every two input lines because one output data line is generated for every two input data lines. Since the reset signal LB1RST is sometimes generated when LB1RD1 is still actively reading from line buffer 108, the reset LB1RST should not corrupt data in the line buffer 108.

In the remaining descriptions, the level of detail contained in the previous three paragraphs will be omitted for clarity.

The odd field of FIG. 4B is produced in an analogous manner with the following special cases at the beginning and end of the field. At the beginning of the field, line 0 (L0) is not used. At the end of the field, the last interlaced output line (L479') should be produced by filtering lines 479 and 480, but line 480 does not exist. Hence, L479' is produced either by not filtering line 479 or by filtering line 479 with itself. Other approaches for handling these special cases will be apparent to those of ordinary skill in the art depending on implementation.

Figure 5A:
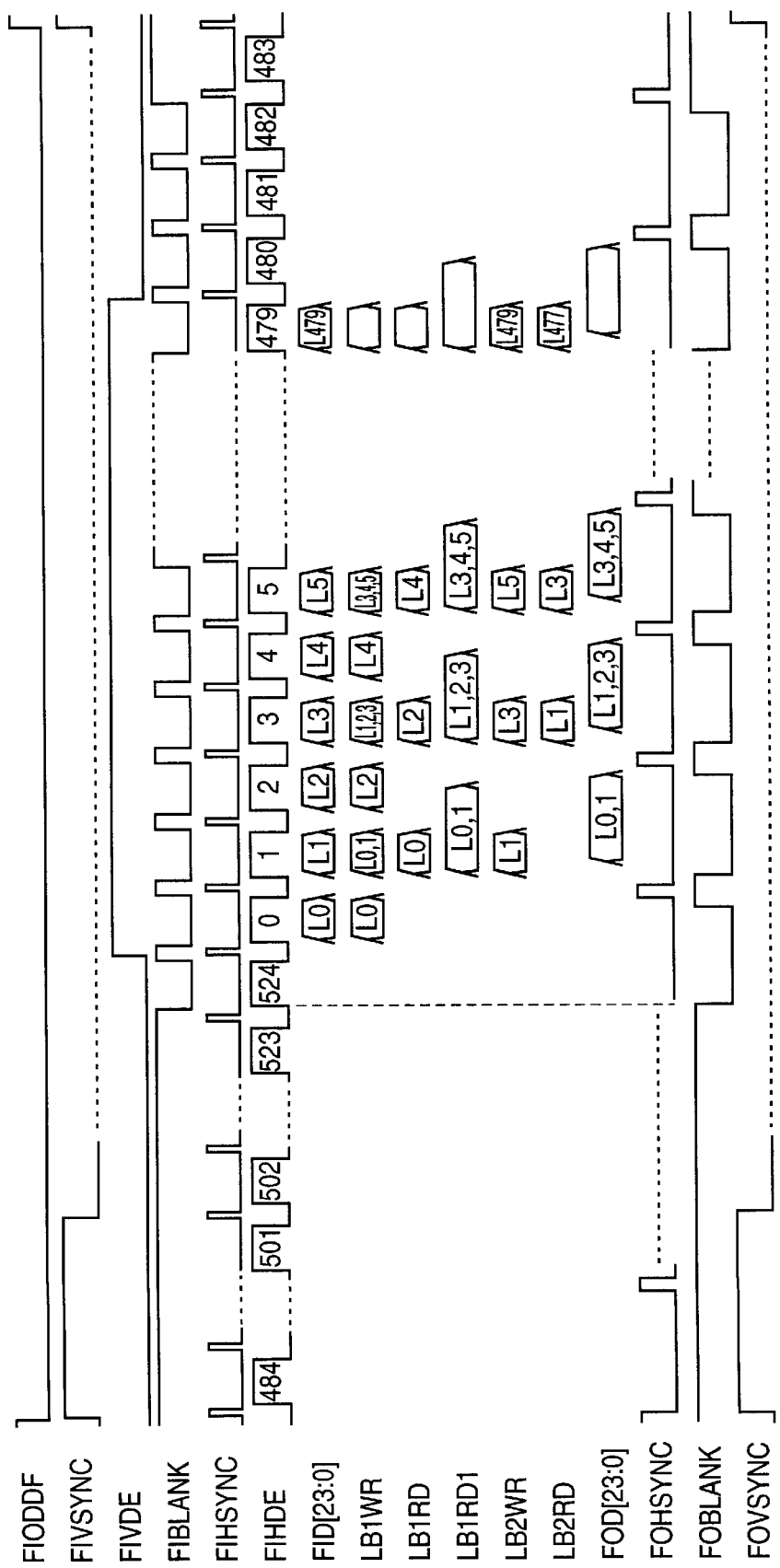
FIGS. 5A and 5B are timing diagrams illustrating a method for 3-tap flicker filtering, utilizing the flicker filter device 104 of FIG. 3.
Figure 5B:
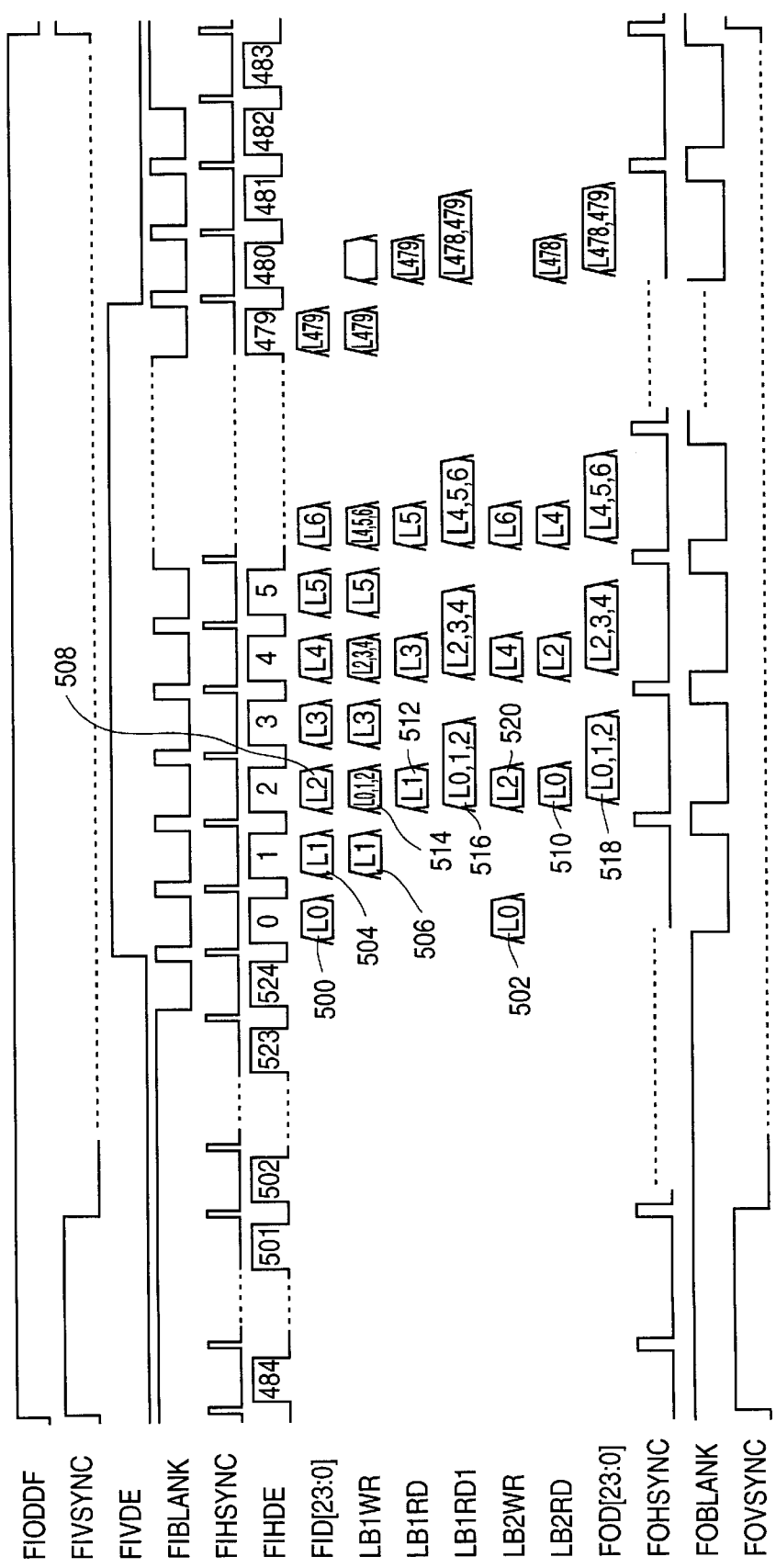

FIGS. 5A and 5B are timing diagrams illustrating a method for 3-tap flicker filtering utilizing the flicker filter device 104 of FIG. 3A. As with FIGS. 4A and 4B, FIG. 5A illustrates the production of an even field of an interlaced format displaying 480 lines; while FIG. 5B illustrates the production of the corresponding odd field.

Basic operation is illustrated by the production of filtered line L0, 1,2 in FIG. 5B. When line 0 (L0) is received 500, it is written 502 to line buffer 110. When line 1 (L1) is received 504, it is written 506 to line buffer 108. When line 2 (L2) is received 508, L0 is read 510 from line buffer 110 and L1 is read 512 from line buffer 108. All three lines L0, L1, and L2 are filtered together and the resulting filtered line L0,1,2 is then written 514 back into line buffer 108. When the filtered data L0,1,2 is written 514 to line buffer 108, it is then read 516 from line buffer 108 and outputted 518 at half the input clock rate. Line 2 is also written 520 to line buffer 110 in preparation for the production of filtered line L2,3,4. The same process is repeated for successive lines.

The read pointer LB2RD and write pointer LB2WR are cleared by LB2RST, which in this embodiment is generated in response to either FIHSYNC or the rising edge of FIHDE.

Special cases may occur at the beginning and end of each field. For example, for the even field of FIG. 5A, filtered line L0,1 is a special case since line −1 does not exist. As another example, for the odd field of FIG. 5B, filtered line L478,479 is a special case since line 480 does not exist. As described previously, various approaches are generally known for handling these special cases.

Figure 6A:
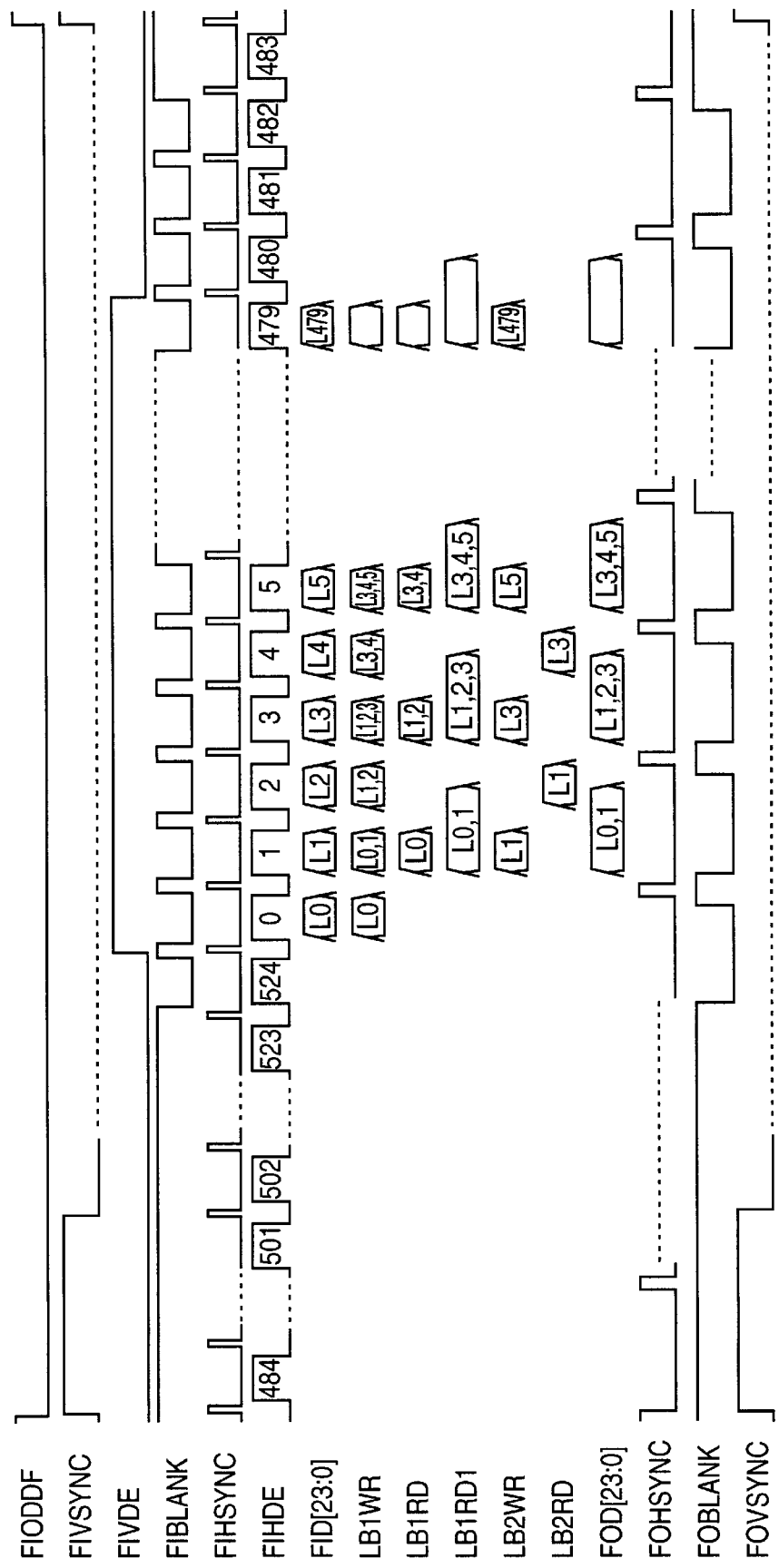
FIGS. 6A and 6B are timing diagrams illustrating a second method for 3-tap flicker filtering, utilizing the flicker filter device 104 of FIG. 3.
Figure 6B:
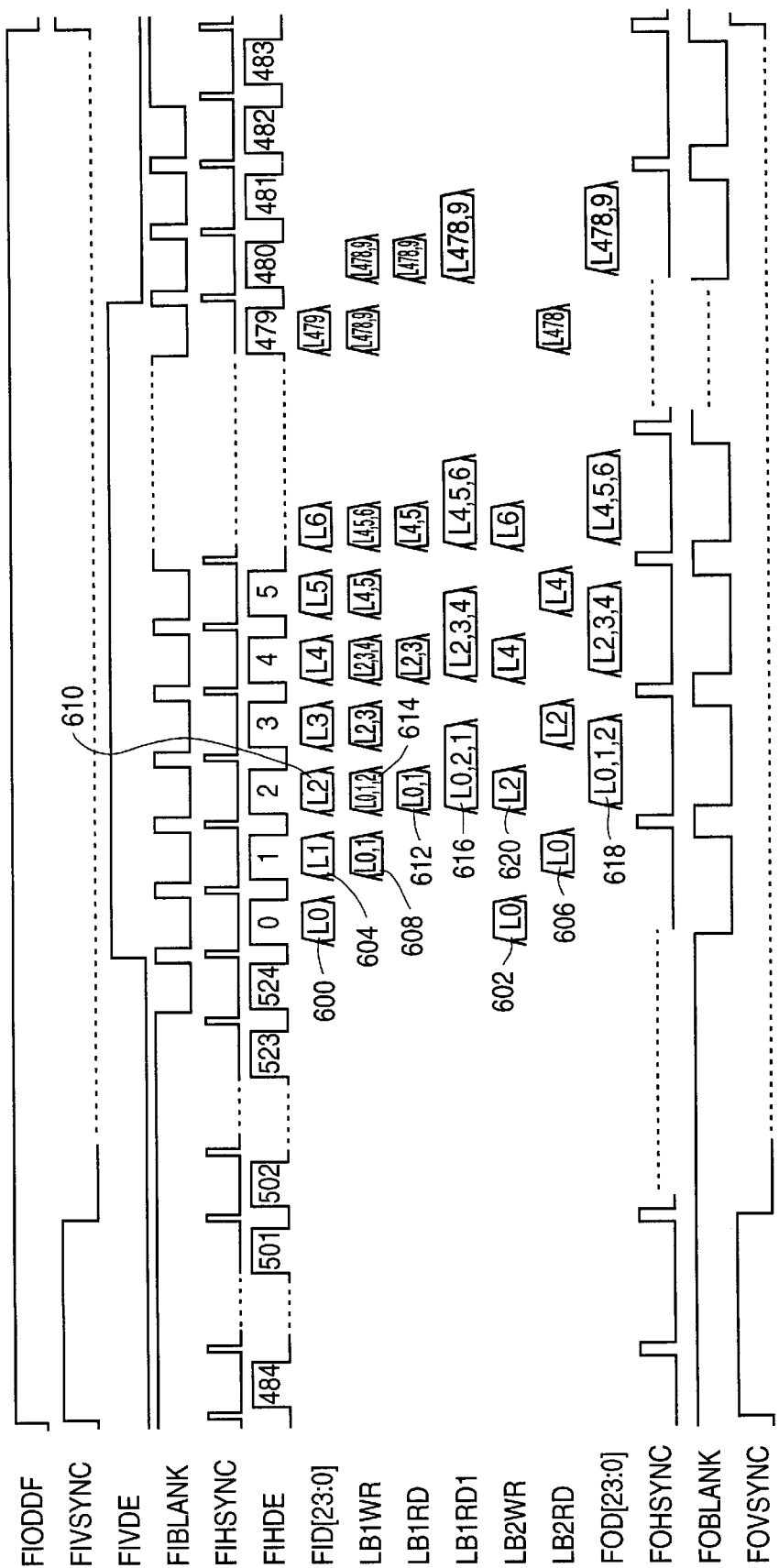

FIGS. 6A and 6B are timing diagrams illustrating a second method for 3-tap flicker filtering utilizing the flicker filter device 104 of FIG. 3A. As usual, FIG. 6A shows production of the even field; while FIG. 6B shows production of the odd field.

Basic operation is illustrated by the production of filtered line L0,1,2 in FIG. 6B. Line 0 (L0) is received 600 and written 602 to line buffer 110. When line 1 (L1) is received 604, line 0 is read 606 from line buffer 110 and filtered with line 1. The resulting filtered line L0,1, which is an intermediate result, is written 608 to line buffer 108. When line 2 (L2) is received 610, intermediate result L0,1 is read 612 from line buffer 108 and filtered with line 2. The filtered line L0,1,2 is then written 614 back to line buffer 108. When the filtered data L0,1,2 is written 614 to line buffer 108, it is then read 616 from line buffer 108 and outputted 618 at half the input clock rate. Line 2 is also written 620 to line buffer 110 in preparation for the production of filtered line L2,3,4. The same process is repeated for successive lines.

Again, special cases may occur at the beginning and/or end of each field. Examples include filtered line L0, 1 in FIG. 6A and filtered line L478,479 in FIG. 6B.

FIGS. 7A and 7B are timing diagrams illustrating a third method for 3-tap flicker filtering utilizing the flicker filter device 104 of FIG. 3A. As usual, FIG. 7A shows production of the even field; while FIG. 7B shows production of the odd field.

Basic operation is illustrated by the production of filtered line L0,1,2 in FIG. 7B. Line 0 (L0) is received 700 and written 702 to line buffer 108. When line 1 (L1) is received 704, line 0 is read 706 from line buffer 108 and filtered with line 1. The resulting filtered line L0,1, which is an intermediate result, is written 708 to line buffer 108. When line 2 (L2) is received 710, intermediate result L0,1 is read 712 from line buffer 108 and filtered with line 2. The filtered line L0,1,2 is then written 714 to line buffer 110. When the filtered data L0,1,2 is written 714 to line buffer 110, it is then read 716 from line buffer 110 and outputted 718 at half the input clock rate. Line 2 is also written 720 to line buffer 108 in preparation for the production of filtered line L2,3,4. The same process is repeated for successive lines. Again, special cases may occur at the beginning and/or end of each field. This method has an advantage of not requiring the second read pointer LB1RD1 for line buffer 108.

The flicker filter device 104 of FIG. 3A may implement any of the 2-tap or 3-tap flicker filtering methods illustrated above. Hence, one advantage of the flicker filter device 104 of FIG. 3A is that the same hardware may be used to implement different flicker filter functions with different numbers of taps.

FIG. 8 is a timing diagram illustrating the production of output control signals from input control signals, utilizing the flicker filter device 104 of FIG. 3. More specifically, the output control circuit 310 generates the interlaced output control signals FOHSYNC, FODE, and FOVSYNC from the non-interlaced mode input control signals FIHSYNC, FIHDE, FIVDE, FIVBLANK, and FIVSYNC. As a result of the conversion from non-interlaced format to interlaced format, input data is received at twice the rate at which output data is generated.

In the preferred embodiment of FIG. 8, the generation of output control signals is initiated at the beginning of the even field. FIG. 8 depicts a time period corresponding to this initiation.

FOHSYNC is generated as follows. The portion of the output control circuit 310 that generates FOHYSNC is reset at the first rising edge 800 of horizontal display enable (FIHDE) that follows the falling edge 802 of vertical blank (FIVBLANK) during even field (i.e., FIODDF is low 804). Reset does not occur during odd fields. The output control circuit 310 determines the start position T1 of FIHSYNC, which is the time between the rising edge 800 of FIHDE and the rising edge 806 of FIHSYNC. The output control circuit 310 also determines the width T2 of FIHSYNC. Both T1 and T2 are multiplied by two to generate the interlaced horizontal sync output FOHSYNC, which is referenced to the leading edge 800 of FIHDE. The flicker filter data pipeline delay is also added in generation of FOHSYNC. In FIG. 8, Latency is provide to match the delay through the flicker filter device 200 and the delay in processing the data in the color space converter 308.

FODE is generated by determining the period T3 from the falling edge 812 of FIHSYNC to the next leading edge 814 of FIHDE. The parameters T1, T2, and T3, are all multiplied by two to produce the interlaced output enable FODE, also referenced to the leading edge 800 of FIHDE.

In the embodiment of FIG. 8, the generation of FOHSYNC and starts one line earlier from the first active input line (L0) or two lines earlier from the first active output data (L0,1) and output display enable (FODE). This results in the correct synchronization of FOHSYNC with FODE and FOD[23:0]. In general, generation of FOHSYNC must begin at a point which ensures that FOHSYNC will be generated in between two output lines.

FOVSYNC is generated by delaying FIVSYNC by the flicker filter data pipeline delay and also by the amount specified in TV VSYNC delay register (SR78). A counter which is used to delay both the rising edge and the falling edge of FIVSYNC by the amount specified by SR78 is incremented by FFCLK/16. Because the vertical sync can be delayed by more than one horizontal time, FIVSYNC can be optionally programmed such that it is generated one line earlier than shown in the above timing diagrams and then delayed by approximately one horizontal time. This is highly recommended because FOVSYNC can then be positioned independently of FOHSYNC. The delay depends on timing based on the programming of the CRT controller.

Although the invention has been described in considerable detail with reference to certain preferred embodiments thereof, other embodiments are possible. For example, the invention can be incorporated into an integrated circuit on a semiconductor device using techniques known in the art. Therefore, the spirit and scope of the appended claims should not be limited to the description of the preferred embodiments contained herein.

What is claimed is:

1. A device for flicker filtering a plurality of non-interlaced lines containing graphics data to form a plurality of interlaced lines, the device programmable to combine either two or three non-interlaced lines to form each interlaced line, the device comprising:

a data packer having an input and two outputs for converting data from an external format to an internal format, the two outputs adapted to write data in the internal format to a first line buffer and to a second line buffer respectively;

a data unpacker having two inputs and a first and a second output for converting data from the internal format to the external format, the two inputs adapted to receive data read from the first line buffer and from the second line buffer respectively, and the first output adapted to output data in the external format; and a filter circuit having two inputs and an output for combining data received at the two inputs into filtered data, the first input adapted to receive graphics data in the external format, the second input coupled to receive data from the second output of the data unpacker, and the output of the filter circuit coupled to send the filtered data in the external format to the input of the data packer.

2. The device of claim 1 wherein the data packer further has a second input adapted to receive data containing graphics in the external format.

3. The device of claim 1 further comprising:

a line buffer write control circuit, adapted to receive an external control signal including a clock, adapted to send a line buffer write control signal to the first and second line buffers, and coupled to send a data packer control signal to the data packer, for generating the line buffer write control signal and the data packer control signal in response to the external control signal; and a line buffer read control circuit, adapted to receive the external control signal, adapted to send a line buffer read control signal to the first and second line buffers, and coupled to send a data unpacker control signal to the data unpacker, for generating the line buffer read control signal and the data unpacker control signal in response to the external control signal.

4. The device of claim 3 wherein the line buffer read control signal comprises:

a first read pulse for reading from the first line buffer; and a second read pulse for reading from the first line buffer.

5. The device of claim 4 wherein:

a first read pulse increments a first pointer to the first line buffer; and the second read pulse increments a second pointer to the first line buffer.

6. The device of claim 1 further comprising:

a color space converter adapted to receive data in a second external format, for converting the data from the second external format to the external format.

7. The device of claim 6 wherein:

the second external format is an RGB format; and the external format is a 4:4:4 signed YCrCb format.

8. The device of claim 1 wherein:

the external format is a 4:4:4 signed YCrCb format.

9. The device of claim 8 wherein:

the internal format is programmably selected from a group consisting of a 4:4:4 YCrCb format, a 4:2:2 YCrCb format, and a 4:1:1 YCrCb format.

10. The device of claim 1 further comprising:

an output control circuit adapted to receive a non-interlaced mode control signal and adapted to send an interlaced mode control signal, for converting the non-interlaced mode control signal to the interlaced mode control signal.

11. The device of claim 10 wherein the non-interlaced mode control signal includes a first horizontal sync signal, a first vertical sync signal, a vertical blank signal, and a horizontal blank signal; and the interlaced mode control signal includes a second horizontal sync signal, a second vertical sync signal, and a blank signal.

12. A method for flicker filtering a plurality of non-interlaced lines to form a plurality of interlaced lines, the method comprising the steps of:

receiving a non-interlaced line in an external format;

converting the received non-interlaced line from the external format to an internal format;

retrieving an intermediate line in the internal format from a line buffer;

combining the non-interlaced and intermediate lines to form a filtered line in the internal format; and converting the filtered line from the internal format to the external format to form an interlaced line.

13. The method of claim 12 wherein the external format is a 4:4:4 signed YCrCb format.

14. The method of claim 13 further comprising the step of:

selecting the internal format from a group consisting of a 4:4:4 YCrCb format, a 4:2:2 YCrCb format, and a 4:1:1 YCrCb format.

15. A method for flicker filtering a plurality of noninterlaced lines to form a plurality of interlaced lines, each interlaced line formed from two non-interlaced lines, the method utilizing a line buffer and comprising the steps of:

receiving a first non-interlaced line in an external format, converting said line to an internal format, and writing said line in the internal format to a line buffer;

reading the first non-interlaced line from the line buffer and converting said line to the external format;

receiving a second non-interlaced line in the external format, and combining the first and second non-interlaced lines to form an interlaced line; and converting the interfaced line to the internal format and writing the interlaced line in the internal format to the line buffer, wherein the step of writing the interlaced line to the line buffer overlaps in time with the step of reading the first non-interlaced line from the line buffer.

16. A method for flicker filtering a plurality of noninterlaced lines to form a plurality of interlaced lines, each interlaced line formed from three non-interlaced lines, the method utilizing two line buffers and comprising the steps of:

receiving a first non-interlaced line in an external format, converting said line to an internal format, and writing said line in the internal format to a first line buffer;

receiving a second non-interlaced line in the external format, converting said line to the internal format, and writing said line in the internal format to a second line buffer;

reading the first non-interlaced line in an internal format from the first line buffer and converting said line to an external format;

reading the second non-interlaced line from the second line buffer and converting said line to the external format;

receiving a third non-interlaced line in the external format, and combining the first, second and third non-interlaced lines to form an interlaced line; and converting the interlaced line to the internal format and writing the interlaced line in the internal format to the second line buffer, wherein the step of writing the interlaced line to the second line buffer overlaps in time with the step of reading the second non-interlaced line from the second line buffer.

17. A method for flicker filtering a plurality of noninterlaced lines to form a plurality of interlaced lines, each interlaced line formed from three non-interlaced lines, the method utilizing two line buffers and comprising the steps of:

receiving a first non-interlaced line in an external format, converting said line to an internal format, and writing said line in the internal format to a first line buffer;

reading the first non-interlaced line from the first line buffer and converting said line to the external format;

receiving a second non-interlaced line in the external format, and combining the first and second non-interlaced lines to form an intermediate line;

converting the intermediate line to the internal format and writing the intermediate line in the internal format to a second line buffer;

reading the intermediate line from the second line buffer and converting said line to the external format;

receiving a third non-interlaced line in the external format and combining the intermediate and third non-interlaced lines to form an interlaced line; and converting the interlaced line to the internal format and writing the interlaced line to the second line buffer, wherein the step of writing the interlaced line to the second line buffer overlaps in time with the step of reading the intermediate line from the second line buffer.

18. A method for flicker filtering a plurality of non-interlaced lines to form a plurality of interlaced lines, each interlaced line formed from three non-interlaced lines, the method utilizing two line buffers and comprising the steps of:

receiving a first non-interlaced line in an external format, converting said line to an internal format, and writing said line in the internal format to a first line buffer;

reading the first non-interlaced line from the first line buffer and converting said line to the external format;

receiving a second non-interlaced line in the external format, and combining the first and second non-interlaced lines to form an intermediate line;

converting the intermediate line to the internal format and writing the intermediate line to the first line buffer, wherein the step of writing the intermediate line to the first line buffer overlaps in time with the step of reading the first non-interlaced line from the first line buffer;

reading the intermediate line from the first line buffer and converting said line to the external format;

receiving a third non-interlaced line in the external format and combining the intermediate and third non-interlaced lines to form an interlaced line; and converting the interlaced line to the internal format and and writing the interlaced line to a second line buffer.

* * * * *